US009069992B1

(12) United States Patent
Vaikar et al.

(10) Patent No.: US 9,069,992 B1
(45) Date of Patent: Jun. 30, 2015

(54) SYSTEM AND METHOD FOR REDUCING DATA LOSS PREVENTION SCANS

(75) Inventors: Amol Vaikar, Pimpale Saudagar (IN); Anindya Banerjee, Wakad (IN); Navin Kabra, Aundh (IN); Amit Verma, Ghaziabad (IN)

(73) Assignee: Symantec Corporation, Mountain View, CA (US)

( * ) Notice: Subject to any disclaimer, the term of this patent is extended or adjusted under 35 U.S.C. 154(b) by 1092 days.

(21) Appl. No.: 12/533,932

(22) Filed: Jul. 31, 2009

(51) Int. Cl.
*G06F 21/10* (2013.01)
*G06F 21/88* (2013.01)

(52) U.S. Cl.
CPC ..................... *G06F 21/88* (2013.01)

(58) Field of Classification Search
CPC ...... G06F 21/88; G06F 21/568; G06F 21/575
USPC ..................................... 726/26–32
See application file for complete search history.

(56) References Cited

U.S. PATENT DOCUMENTS

| 7,069,594 | B1 * | 6/2006 | Bolin ............................. 726/26 |
| 7,739,738 | B1 * | 6/2010 | Sobel et al. ..................... 726/24 |
| 7,761,922 | B1 * | 7/2010 | Baum et al. ..................... 726/26 |
| 7,996,373 | B1 * | 8/2011 | Zoppas et al. ................. 707/694 |
| 8,037,537 | B1 * | 10/2011 | Sharma et al. .................. 726/26 |
| 8,438,630 | B1 * | 5/2013 | Clifford .......................... 726/13 |
| 8,752,758 | B1 * | 6/2014 | Klebe ........................... 235/375 |
| 8,775,369 | B2 * | 7/2014 | Largman et al. ............. 707/609 |
| 2008/0216174 | A1 * | 9/2008 | Vogel et al. ...................... 726/22 |
| 2010/0024037 | A1 * | 1/2010 | Grzymala-Busse et al. .... 726/26 |
| 2010/0162347 | A1 * | 6/2010 | Barile .............................. 726/1 |
| 2010/0306552 | A1 * | 12/2010 | LeVine et al. ................. 713/189 |
| 2011/0040983 | A1 * | 2/2011 | Grzymala-Busse et al. .. 713/189 |

* cited by examiner

*Primary Examiner* — Tamara T Kyle
(74) *Attorney, Agent, or Firm* — Lowenstein Sandler LLP

(57) ABSTRACT

A computing device receives a file. The computing device determines whether the file has previously been scanned for violations of a data loss prevention policy. If the file was previously scanned, a result of the previous scan is used to decide whether or not the file violates the data loss prevention policy. If the file was not previously scanned, the file is scanned to decide whether or not the file violates the data loss prevention policy.

19 Claims, 10 Drawing Sheets

US 9,069,992 B1

SYSTEM AND METHOD FOR REDUCING DATA LOSS PREVENTION SCANS

FIELD OF INVENTION

Embodiments of the invention relate to the field of data security, and more particularly, to reducing the number of scans performed by a data loss prevention system to protect data.

BACKGROUND OF THE INVENTION

Data loss prevention (DLP) solutions are used to protect sensitive data on a computer and/or network. A DLP product monitors a computer and/or network to identify sensitive data. Such monitoring typically includes scanning all at rest files and all data that is transmitted (e.g., via email, file transfer protocol (FTP), instant messages, etc.). Each scan consumes system resources. Thus, by scanning all files and all transmitted data, considerable resources may be consumed.

SUMMARY OF THE INVENTION

A computing device receives a file. The computing device determines whether the file has previously been scanned for violations of a data loss prevention policy. If the file was previously scanned, a result of the previous scan is used to decide whether or not the file violates the data loss prevention policy. If the file was not previously scanned, the file is scanned to decide whether or not the file violates the data loss prevention policy.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1:
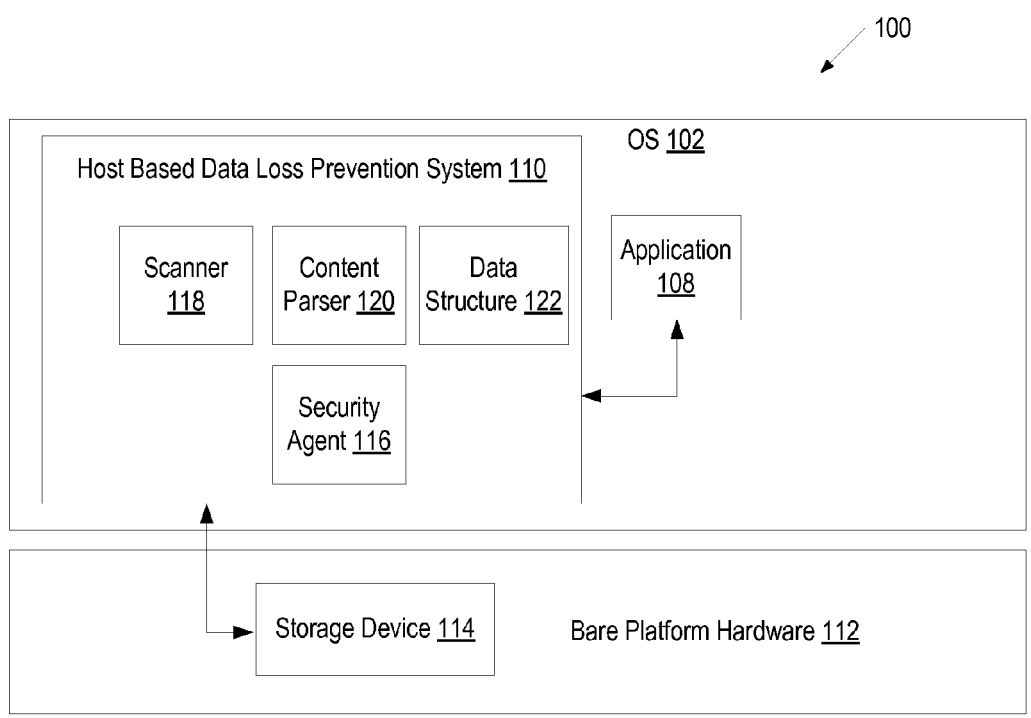
FIG. 1 illustrates a computing device, in accordance with one embodiment of the present invention.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "determining", "using", "scanning", "comparing", "generating" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

FIG. 1 illustrates a computing device 100, in accordance with one embodiment of the present invention. The computing device 100 includes bare platform hardware 112 and an operating system (OS) 102 that operates on the bare platform hardware 112. The platform hardware 112 can be of a personal computer (PC), server computer, mainframe, handheld device, portable computer, set-top box, or any other computing system. The platform hardware 112 can include a processor, memory, input/output (I/O) devices, a storage device 114, etc. The storage device 114 may be a non-volatile memory such as a hard disk drive, tape drive, optical disc drive, etc.

The operating system (OS) 102 provides an interface between bare platform hardware 112 and applications (e.g., application 108 and host based data loss prevention system 110). The interface may include a collection of services that the OS 102 provides to applications (e.g., via system calls). Operating system 102 also manages and coordinates the sharing of resources between itself and the applications that run on it (e.g., application 108 and host based DLP 110).

In one embodiment, a host based data loss prevention (DLP) system 110 runs on operating system 102 to prevent the loss of sensitive data. Sensitive data may include, for example, account user names and passwords, credit card numbers, social security numbers, account numbers, employee numbers, driver license numbers, license plate numbers, etc. The host based DLP system 110 may include both user mode components (processes that do not have privileged access to system resources) and kernel mode components (processes that have privileged access to system resources). Host based DLP system 110 prevents the loss of data by scanning data for confidential information, and applying one or more DLP policies when confidential information is discovered.

In one embodiment, host based DLP 110 includes a security agent 116, a scanner 118, a content parser 120 and a data structure 122. Security agent 116 identifies data to check for confidential information. Security agent 116 may identify data that is at rest (e.g., stored in storage device 114) and/or data that is in transit (being transmitted to computing device 100 or from computing device 100). In transit data may be detected regardless of the mode of transportation used. For example, security agent 116 may identify data that is contained in an instant message, email, file transfer protocol (FTP) transfer, blog post, print job, etc.

In one embodiment, security agent 116 includes a file system filter driver configured to protect sensitive data. Alternatively and/or in addition, the security agent 116 may include a disk filter driver (not shown). A file system filter driver is a driver that modifies the behavior of a file system. In one embodiment, the security agent 116 filters I/O requests for one or more file systems and/or file system volumes. The security agent 116 can log, observe, modify and/or prevent I/O operations for file systems controlled by OS 102.

In one embodiment, the file system filter driver is configured to intercept I/O operations. These operations include creating, opening, closing, and enumerating files and directories; getting and setting file, directory, and volume information; and reading and writing file data. The file system filter driver may also support file system-specific features such as caching, locking, sparse files, disk quotas, compression, security, recoverability, reparse points, and volume mount points.

In one embodiment, security agent 116 can intercept all I/O operation commands from applications (e.g., application 108) and routines running on OS 102. Once security agent 116 intercepts an I/O operation, it notifies the content parser 120 of the I/O operation, and identifies the data associated with the I/O operation.

Content parser 120 determines whether the data associated with the intercepted I/O operation has previously been scanned. In one embodiment, content parser 120 makes this determination by checking metadata associated with the identified data. If the data has previously been scanned, it may include metadata that identifies a result of the scan. The metadata may identify, for example, that the data contains confidential information or that the data does not contain confidential information. The metadata may also include a time stamp that identifies when the previous scan was performed, an indicator of the DLP rules that were enabled when the data was scanned (including version numbers of the DLP rules) and a digital fingerprint (or checksum, hash, signature, etc.) of the state of the data when it was last scanned. In one embodiment, the metadata includes a digital signature of the host based DLP system 110 that performed the scan (e.g., has been digitally signed by the host based DLP system 110). The digital signature may be encrypted using an asymmetric encryption key (e.g., a private encryption key that has a public encryption key counterpart). The content parser 120 may contain a public encryption key that can be used to decrypt the signature to read and/or modify the metadata. Alternatively, the signature may be encrypted using a private encryption key shared by the host based DLP 110, other host based DLPs and/or a network based DLP.

Content parser 120 may compute a fingerprint (or checksum, hash, signature, etc.) of the data and compare the computed fingerprint to a previously generated fingerprint that is included in the metadata. If the computed signature matches the previously generated signature, then the data has not been changed since the last scan was performed, and the result of the scan can be used without performing a new scan. In another embodiment, content parser 120 compares a timestamp of the last time a scan of the data was performed to an additional timestamp that identifies when the data was last modified. If the last scan was performed after the data was last modified, then no new scan of the data may be necessary. This may conserve system resources. Content parser 120 may also compare a version of the DLP policies that were enabled when the previous scan was performed to current versions of the DLP policies. If the DLP policies have been changed since the last scan was performed, then a new scan may be performed even if the contents of the data have not changed since the previous scan.

Content parser 120 may check entire files for the presence of confidential or sensitive information. Alternatively, content parser 120 may divide files into segments (e.g., blocks), and separately check each segment for the presence of confidential information. Content parser 120 may look for files that have previously been scanned and/or portions of files that have already been scanned. Even if a current file has not already been scanned, portions of the file may correspond to portions of other files that have already been scanned. By looking for matches between portions of a current file and portions of previously scanned files, additional resources may be conserved.

In one embodiment, metadata is attached to the data with which the metadata is associated. The data and attached metadata may be stored in storage 114, or in a remote network storage (not shown). In another embodiment, host based DLP 110 maintains a data structure 122 that contains metadata associated with scanned data (e.g., scanned files). The data structure 122 may contain a record of data that has been previously scanned. Rather than consulting metadata attached to the data to determine whether the data has been previously scanned, content parser 120 may instead consult the data structure 122. Alternatively, content parser 120 may use both the data structure 122 and metadata attached to the data.

In some embodiment, the data structure 122 is not a component of the host based DLP system 110. For example, the data structure 122 may be a single instance storage (SIS) database. A single instance storage database enables the computing device 100 to keep one copy of data that multiple users share and/or that is saved at multiple different locations. SIS works by searching a hard disk to identify duplicate files. When SIS finds identical files, it replaces all but one copy of the file with pointers to that one copy. In one embodiment, SIS writes a copy of the file to a central repository, and replaces all other copies with pointers to the file in the central repository.

Upon determining that the data needs to be scanned, content parser 120 passes the data to scanner 118. Scanner 118 then scans the data for the presence of sensitive information. Scanner 118 may scan the data using one or more search techniques. In one embodiment, the scanner 118 scans the data using an indexed document matching (IDM) and/or exact data matching (EDM) technique. Using indexed document matching, the scanner 118 computes a fingerprint of the data, and compares the fingerprint to a collection of fingerprints that have been taken of confidential data. In one embodiment, the fingerprint that is used during scanning is the same fingerprint that was computed by the content parser 120. In another embodiment, the scanner 118 computes a different fingerprint (e.g., using a different fingerprint generating algorithm) than was computed by the content parser 120. If the fingerprint of the data matches or is similar to a fingerprint of known confidential data, then the scanner 118 may identify the data as containing confidential information.

Scanner 118 may also identify the amount of confidential information contained in the data and/or the percentage of the data that includes confidential information. Scanner 118 may also scan the data using a heuristic approach such as described content matching (DCM). In DCM, scanner 118 contains a collection of characteristics commonly found in confidential information, and searches data for the presence of these characteristics. Characteristics searched for may include keywords, lexicons, patterns, file attributes, and so on. For example, scanner 118 may look for groupings of nine digits to identify possible social security numbers, and may look for groupings of sixteen digits that begin with 4 or 5 to identify credit card numbers.

Once scanner 118 or content parser 120 determine that the data includes confidential information, host based DLP 110 determines whether the presence of the confidential information violates any DLP policies. If a DLP policy is violated, then one or more actions identified in the DLP policy are performed. A DLP policy may be violated, for example, if more than a certain amount of confidential information is included in a file, if the file includes certain types of confidential information (e.g., credit card numbers), if a certain percentage of the data contains confidential information, etc. Examples of actions that may be taken include blocking access to the data, preventing an I/O operation from being performed, encrypting the data, notifying an administrator of the violation, etc.

Figure 2:
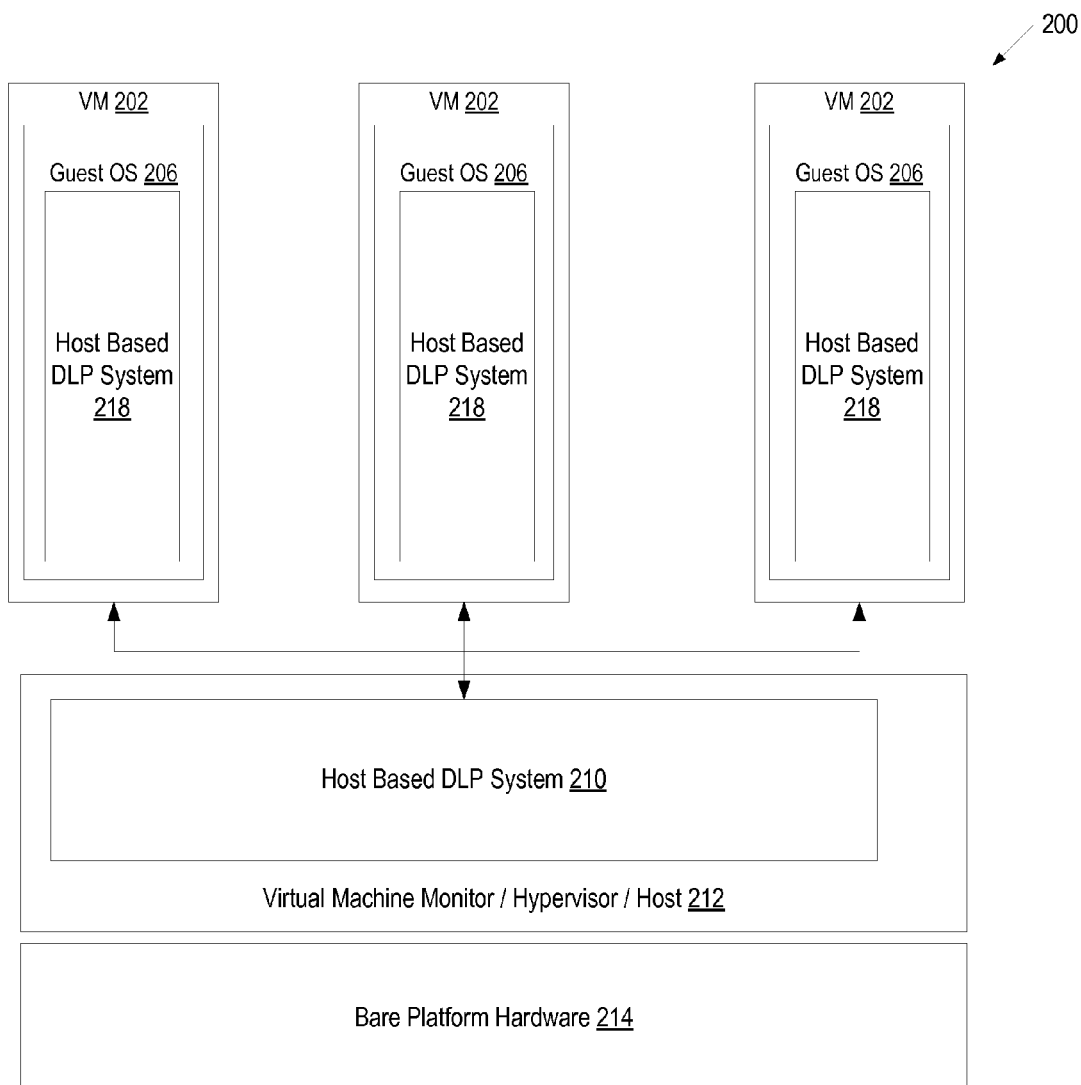
FIG. 2 illustrates a computing device, in accordance with another embodiment of the present invention.

FIG. 2 illustrates a computing device 200, in accordance with another embodiment of the present invention. The computing device 200 includes bare platform hardware 214, a virtual machine monitor (VMM) 212 and one or more virtual machines 202. Each of the virtual machines 202 hosts a guest operating system 206. The platform hardware 214 can include a processor, memory, input/output (I/O) devices, a storage device, etc.

The VMM (also known as a hypervisor) 212, though typically implemented in software, may emulate and export a bare machine interface to higher level software. Such higher level software may comprise a standard or real-time OS, may be a highly stripped down operating environment with limited operating system functionality, may not include traditional OS facilities, etc. In one embodiment, the VMM 212 is run directly on bare platform hardware 214. In another embodiment, the VMM 212 is run on top of a host OS. Alternatively, for example, the VMM 212 may be run within, or on top of, another VMM. VMMs may be implemented, for example, in hardware, software, firmware or by a combination of various techniques.

The VMM 212 presents to other software (i.e., "guest" software) the abstraction of one or more virtual machines (VMs), which may provide the same or different abstractions to the various guests. FIG. 2 shows multiple virtual machines 202, each with a guest operating system 206. Each guest OS 206 may include a host based DLP system 218 that manages DLP policies on the guest OS 206. The host based DLP system 218 can be a component of the guest OS 206, a plugin of the guest OS 206, or a separate module running on the guest OS 206. Alternatively, or in addition, the VMM 212 may include a host based DLP system 210. The host based DLP system 210 can be a component of the VMM 212, a plugin of the VMM 212, or a separate module within the VMM layer with the same privilege level as the VMM 212. Each of the host based DLP systems 218 and the host based DLP system 210 may include a scanner, content parser, data structure, and/or security agent, as described above with reference to FIG. 1.

When a VM 202 is shut off, the VM 202 may be stored as a virtual machine file that contains the state of the VM 202. A virtual machine file defines a memory state of a virtual machine (e.g., of one of virtual machines 202). Examples of virtual machine files include .VMX files, .VMDK files, .VHD files, etc. The virtual machine files may be mounted by virtualization software to generate the virtual machines 202. In one embodiment, host based DLP system 210 can scan the files of VMs 202 to determine whether any contents within the VM 202 includes confidential information.

A host based DLP system 218 that runs on a guest OS 206 may only have access to data contained in a single virtual machine 202. However, a host based DLP system 210 at the VMM 212 may have access to data included in multiple VMs 202. Commonly, many of the VMs 202 include at least some of the same data. Accordingly, the host based DLP system 210 in the VMM 212 may be able to significantly reduce the number of DLP scans that need to be performed on data by identifying data shared by multiple VMs 202, and scanning the shared data only once. A scan result of the single scan may then be applied to the copies of the data in each of the VMs 202. This may significantly reduce resources used to scan data for violation of DLP policies.

Figure 3:
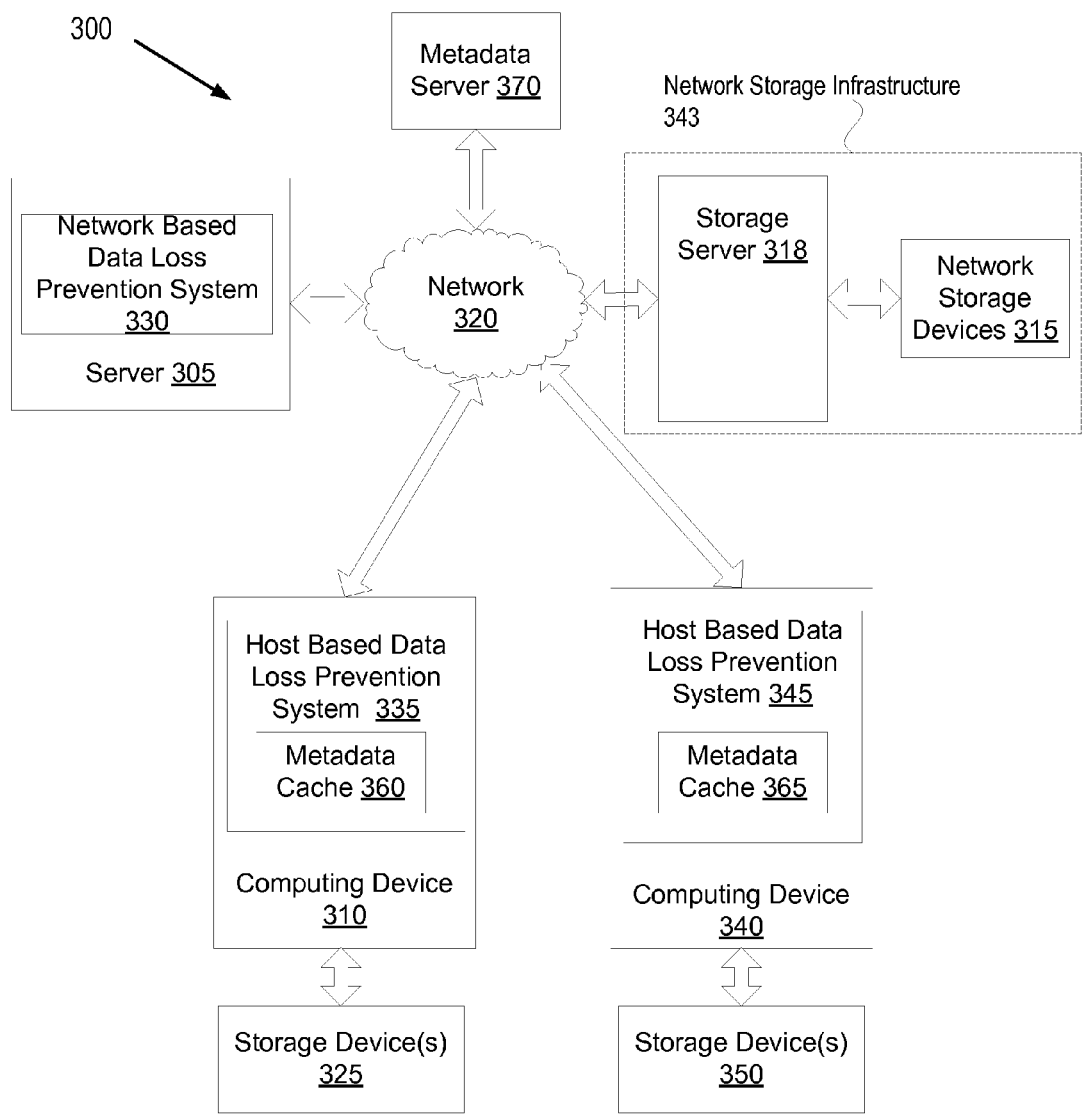
FIG. 3 illustrates an exemplary network architecture, in which embodiments of the present application may operate.

FIG. 3 illustrates an exemplary network architecture 300, in which embodiments of the present application may operate. The network architecture 300 may include a server 305, computing devices 310, 340 and network storage infrastructure 343 connected via a network 320. The network 320 may be a public network (e.g., the Internet) or a private network (e.g., a local area network (LAN) or wide area network (WAN)). Network 320 may be the network of an enterprise, and may also include such devices as network printers, switches, routers, gateways, firewalls, or any other devices having a network address.

The network storage infrastructure 343 may include a storage server 318 and one or more network storage devices 315 managed by the storage server 318 that provide storage to computing devices 310, 340. Storage server 318 may be configured to provide file-level access (e.g., as provided by network attached storage (NAS)), block-level access (e.g., as provided by a storage area network (SAN)), or a combination of file-level access and block-level access to data stored on the network storage devices 315.

The computing devices 310 and 340 may be laptop computers, desktop computers, mobile phones, personal digital assistants (PDAs), or other endpoint computing devices connected to network 320. Computing devices 310, 340 may correspond to computing device 100 of FIG. 1 or computing device 200 of FIG. 2. Each computing device 310, 340 includes a host based data loss prevention system (DLP) 335, 345. Each host based DLP system 335, 345 protects a specific computing device 310, 340 from data loss. In one embodiment, each host based DLP system 335 includes its own data structure. Each data structure may contain the same or different metadata from data structures of other computing devices. In one embodiment, the host based DLP systems 335, 345 may notify a network based data loss prevention system 330 when a new scan is performed, and/or may send the result of the new scan along with information about the data scanned (e.g., metadata associated with the data) to the network based DLP system 330. In one embodiment, a host based DLP system 335 communicates scans it has made to other computing devices.

In one embodiment, network infrastructure 300 includes a metadata server 370 connected with computing devices 310, 340 and/or server 305 via network 320. Metadata server 370 maintains a metadata data structure that may be accessed by host based DLP systems 335, 345 and/or the network based DLP system 330. Rather than host based DLP systems 335, 345 maintaining their own metadata data structures, the host based DLP systems 335, 345 may instead transmit metadata generated from scans to the metadata server 370. When a host based DLP system 335, 345 attempts to determine whether data has previously been scanned, it may query the metadata server 370. If the data has been previously scanned (either by the requesting host based DLP system or another host based DLP system), the metadata server 370 responds with the scan results.

In one embodiment, the host based DLP systems 335, 345 each include a metadata cache 360, 365. Metadata for recently scanned data and/or metadata that has recently been received from metadata server 370 may be stored in the metadata cache 360, 365. Before sending a query to the metadata server 370, host a based DLP system 335, 345 checks the metadata cache 360, 365 to determine if the appropriate metadata is stored thereon. If the metadata associated with the data in question is stored in the metadata cache 360, it may be unnecessary to send a query to the metadata server 370. In one embodiment, if the appropriate metadata is stored in the metadata cache 360, the host based DLP system 335, 345 may still query the metadata server 370. This may occur, for example, if the data being checked was modified since a previous scan, or if one or more DLP policies of the DLP system have been modified since the data was last scanned.

The server 305 may be a computing device such as, for example, a desktop computer, laptop computer, server, etc. Server 305 includes a network based DLP system 330. The network based DLP system 330 protects sensitive data that is at rest and/or in transit on network 320. Network based DLP system 330 may protect data that is present on network storage 315 and/or data that is present on storage devices 325, 335 of individual computing devices 310, 340. The server 305 in one embodiment is a network appliance that is configured to enforce network DLP policies on network 320. In another embodiment, the network based DLP system 330 is included in storage server 318.

In one embodiment, metadata server 370 is a component of network based DLP system 330. In another embodiment, network based DLP system 330 utilizes metadata server rather than maintaining its own metadata data structure.

In one embodiment, network based DLP system 330 provides a DLP service from a cloud computing environment. Cloud computing is a scalable class of computing, in which resources are provided as service over a network (e.g., the Internet). The network based DLP system 330 may be hosted by a service provider, and provide DLP services to remote clients and/or an entire remote private network.

Figure 4:
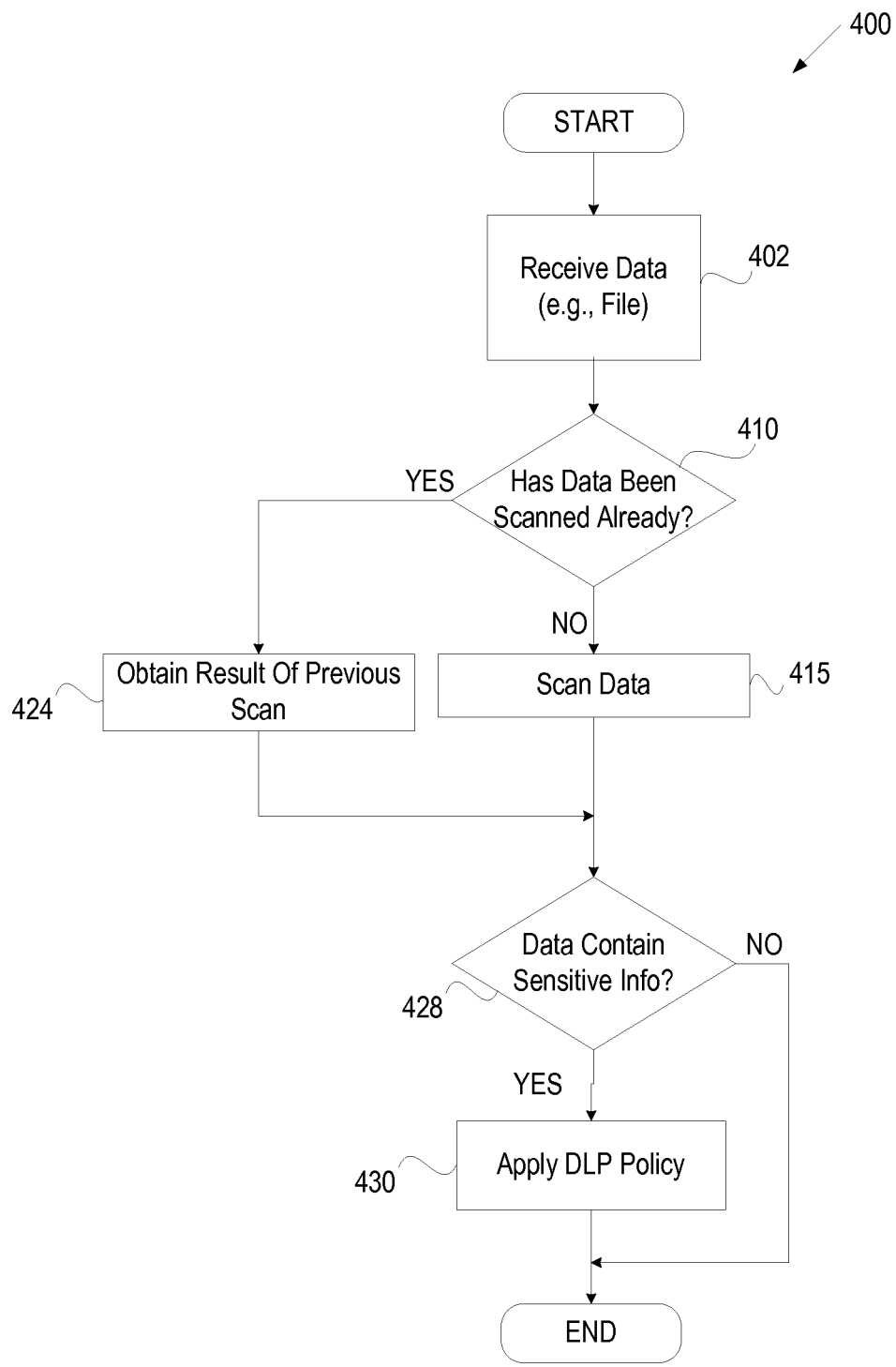
FIG. 4 is a flow diagram of one embodiment of a method for protecting sensitive data using a reduced number of DLP scans.

FIG. 4 is a flow diagram of one embodiment of a method 400 for protecting sensitive data using a reduced number of DLP scans. The method 400 is performed by processing logic that may comprise hardware (circuitry, dedicated logic, etc.), software (such as is run on a general purpose computer system or a dedicated machine), or a combination of both. Method 400 may be performed by a host based DLP system or network based DLP system, such as those discussed with reference to the preceding figures.

Referring to FIG. 4, at block 402 a computing device receives data that may include sensitive information. The data may be received by a data loss prevention system operating on the computing device. In one embodiment, the data is received in response to a request to perform an I/O operation on the data. In another embodiment, the data is received during backup. Alternatively, the data may be included in an intercepted message. The intercepted message may have been transmitted via an instant messaging system, e-mail, file transfer protocol, or another transmission protocol. The data may be a file (e.g., a document), e-mail, body of an instant message, or other data format.

At block 410, the data loss prevention system determines whether the data has already been scanned. In one embodiment, such a determination is made by checking metadata that is attached to the data. For example, if the data is a file, then the metadata may be included in an inode of the file. In another embodiment, the determination of whether the data has already been scanned is made by checking a data structure. The data structure may be, for example, a metadata table that includes results of previous scans.

The metadata may identify whether or not a previous scan has been performed for the data, when the scan was performed, a result of the scan, a checksum, hash, fingerprint or signature of the data, and/or other information. The scan result included in the metadata may identify whether or not sensitive information was included in the data, the type of sensitive information in the data, the amount of sensitive information in the data, the percentage of the data that contains sensitive information, and/or additional inflammation about the data.

If the data has already been scanned, the method proceeds to block 424. If the data has not previously been scanned, the method proceeds to block 415. A block 415, the data loss prevention system scans the file. Numerous different techniques for identifying sensitive information may be performed for the scan. For example, a fingerprint of the data may be compared to fingerprints of data known to contain sensitive information. If the fingerprints match or are similar, then it may be determined at the data includes sensitive information. In another technique, a heuristic engine may determine whether contents of the data resemble confidential information. Other techniques may also be used.

At block 424, the data loss prevention system obtains the result of the previous scan.

At block 428, the data loss prevention system examines the result of the scan to determine whether the data contains sensitive information. If the data does contain sensitive information, the method proceeds to block 430. Otherwise, the method ends.

At block 430, the data loss prevention system applies one or more data loss prevention policies to the data. This may include performing actions of one or more data loss prevention policies that have been violated by the data. For example, if a data loss prevention policy indicates that no more than 30% of the data should contain confidential information, and 40% of the data contains confidential information, then the DLP policy has been violated. The DLP policy may identify one or more actions to be performed as a result of the violation. Such actions may include, for example, notifying an administrator, blocking access to the data, and/or other actions.

Figure 5:
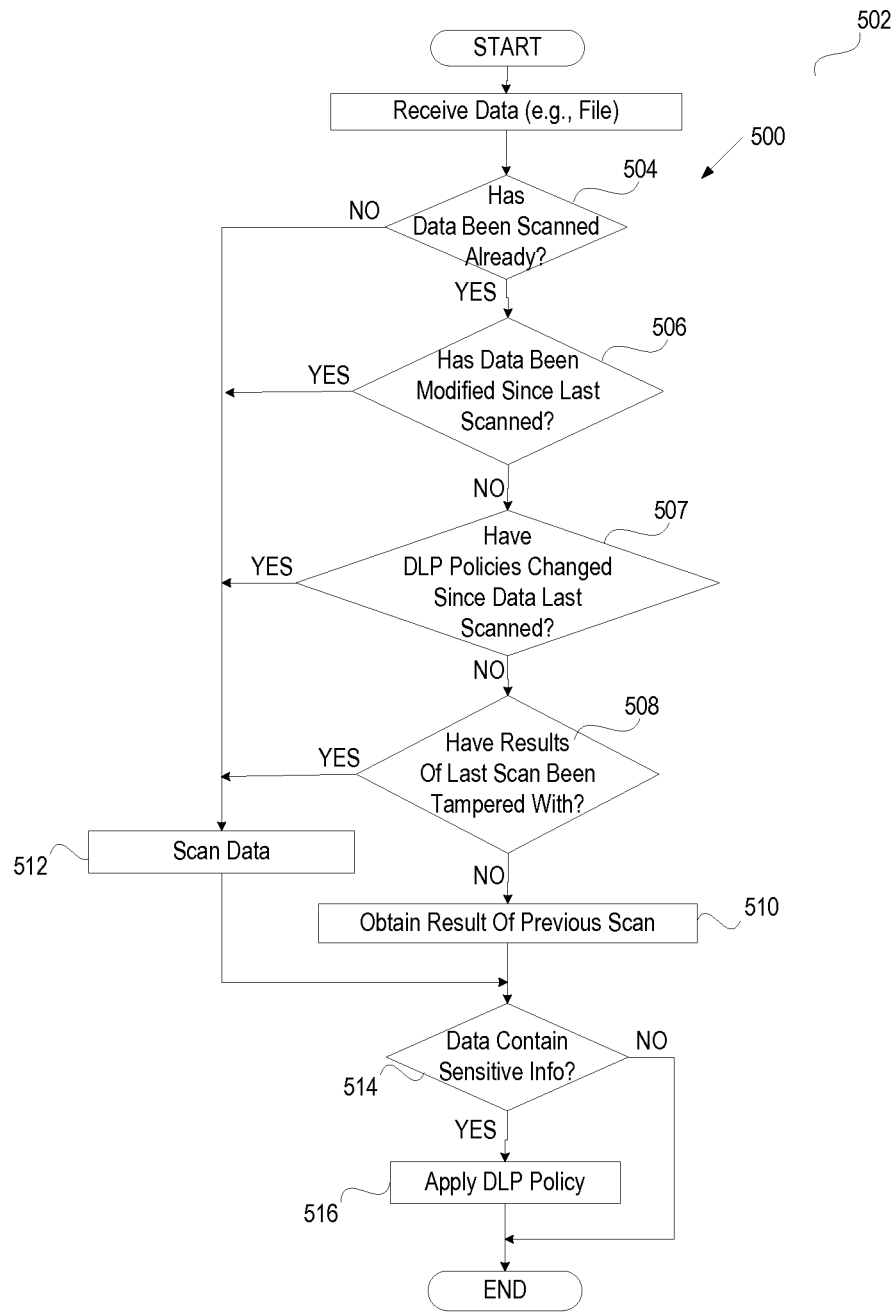
FIG. 5 is a flow diagram of another embodiment of a method for protecting sensitive data using a reduced number of DLP scans.

FIG. 5 is a flow diagram of another embodiment of a method 500 for protecting sensitive data using a reduced number of DLP scans. The method 500 is performed by processing logic that may comprise hardware (circuitry, dedicated logic, etc.), software (such as is run on a general purpose computer system or a dedicated machine), or a combination of both. Method 500 may be performed by a host based DLP system or network based DLP system, such as those discussed with reference to the preceding figures.

Referring to FIG. 5, at block 502 a computing device receives data that may include sensitive information. The data may be received by a data loss prevention system operating on the computing device.

At block 504, the data loss prevention system determines whether the data has already been scanned. If the data has not already been scanned, the method proceeds to block 512. If the data has previously been scanned, the method proceeds to block 506.

At block 506, the data loss prevention system determines whether the file has been modified since it was last scanned. In one embodiment, each time data is scanned, a fingerprint (or checksum, hash, signature, etc.) of the data is generated. This fingerprint may be attached to the data or placed in a data structure. The DLP system may determine whether the data has been modified since the last scan by generating a new fingerprint of the data and comparing the new fingerprint to the stored signature. If the two fingerprints match, then the data has not been modified since the previous scan, and the method continues to block 507. If the fingerprints differ, then the data has been modified, and the method proceeds to block 512.

At block 507, the data loss prevention system determines whether any DLP policies have changed since the data was last scanned. This may include determining whether any new DLP policies have been added since the data was last scanned. If one or more DLP policies have changed, the method proceeds to block 512. If no DLP policies have changed, the method continues to block 508.

At block 508, the DLP system determines whether results of the last scan have been tampered with. When a scan is generated, a result of the scan may be added to a data structure or appended to the data itself. To prevent unauthorized modification of the results, the results may be signed using a digital signature (e.g., with a public key infrastructure (PKI) certificate). The digital signature may show whether or not the results have been tampered with, and/or may prevent the results from being tampered with. If the results of the last scan have been tempered with, the method continues to block 512. If the results have not been tampered with, the method continues to block 510.

A block 512, the data loss prevention system scans the file. At block 510, the data loss prevention system obtains the result of the previous scan.

At block 514, the data loss prevention system examines the result of the scan to determine whether the data contains sensitive information. If the data does contain sensitive information, the method proceeds to block 516. Otherwise, the method ends.

At block 516, the data loss prevention system applies one or more data loss prevention policies to the data. The method then ends.

Figure 6:
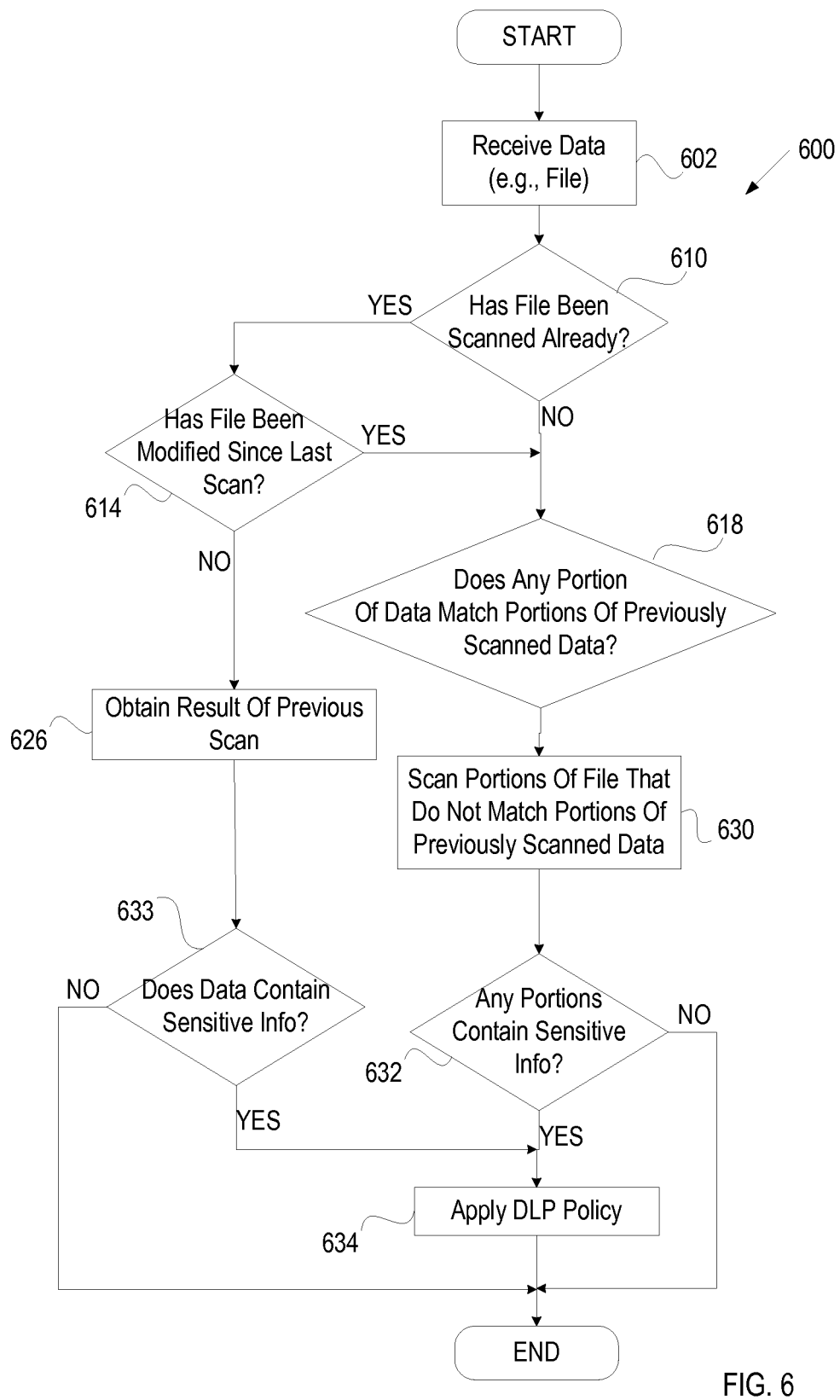
FIG. 6 is a flow diagram of yet another embodiment of a method for protecting sensitive data using a reduced number of DLP scans.

FIG. 6 is a flow diagram of yet another embodiment of a method 600 for protecting sensitive data using a reduced number of DLP scans. The method 600 is performed by processing logic that may comprise hardware (circuitry, dedicated logic, etc.), software (such as is run on a general purpose computer system or a dedicated machine), or a combination of both. Method 600 may be performed by a host based DLP system or network based DLP system, such as those discussed with reference to the preceding figures.

Referring to FIG. 6, at block 602 a computing device receives data that may include sensitive information. The data may be received by a data loss prevention system operating on the computing device.

At block 610, the data loss prevention system determines whether the data has already been scanned. If the data has already been scanned, the method proceeds to block 614. If the data has not previously been scanned, the method proceeds to block 618.

At block 614, the DLP system determines whether the data has been modified since it was last scanned. If the data has been modified since the last scan, the method proceeds to block 618. Otherwise, the method proceeds to block 626.

At block 618, the DLP system determines whether any portions of the data match portions of previously scanned data. In one embodiment, during scanning data is broken up into smaller portions. A separate scan may be performed for each of the smaller portions. Results of the scans of each portion may be recorded either as metadata (e.g., fingerprints, checksums, etc.) attached to the data, or as entries in a data structure. For each portion of the data that matches a previously scanned portion of other data, the results of the previous scan for the other portion may be used.

At block 630, those portions of the file that do not match portions of previously scanned data are scanned for sensitive information. The method then proceeds to block 632.

At block 626, the results of the previous scan are obtained. The method continues to block 633.

At block 633, the data loss prevention system determines whether the data contains sensitive information based on the obtained result. If the data does contain sensitive information, the method proceeds to block 634. Otherwise, the method ends.

At block 632, the data loss prevention system examines the result or results of the one or more scans to determine whether the data contains sensitive information. It may be determined that the data contains sensitive information if any portions of the data contained sensitive information. In one embodiment, the operations of block 632 are performed prior to the operations of block 630. In one embodiment, the operations at block 630 are only performed if it is determined that less than a threshold amount of sensitive information is included in the previously scanned portions of the data. The threshold amount of sensitive information may range from zero sensitive information and up. Alternatively, the portions of the data that do not match portions of previously scanned data may be scanned regardless of whether the matching portions contain sensitive information.

If at block 632 the data does contain sensitive information, the method proceeds to block 634. Otherwise, the method ends. At block 634, the data loss prevention system applies one or more data loss prevention policies to the data.

Figure 7A:
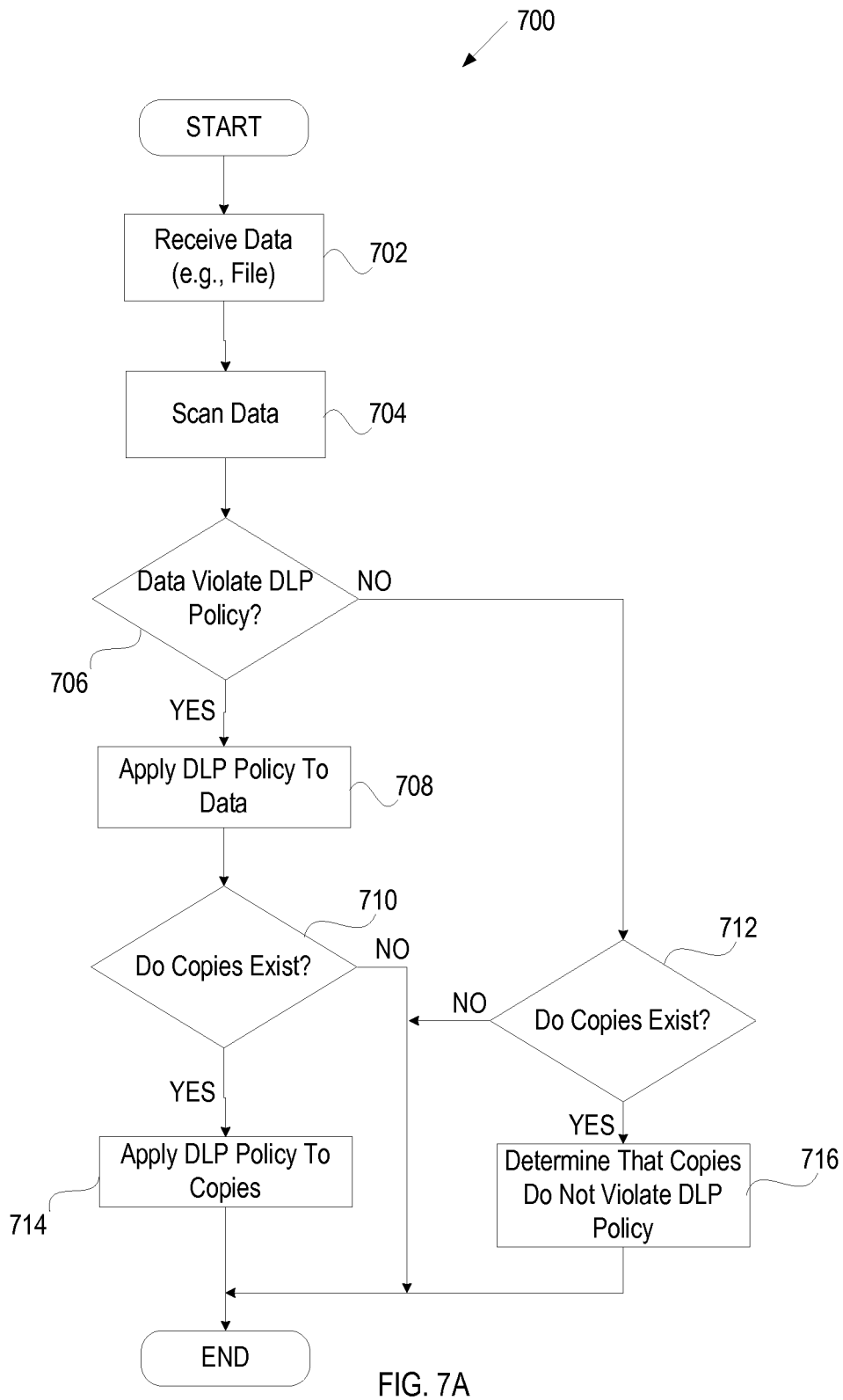
FIG. 7A is a flow diagram of still yet another embodiment of a method for protecting sensitive data using a reduced number of DLP scans.

FIG. 7A is a flow diagram of still yet another embodiment of a method 700 for protecting sensitive data using a reduced number of DLP scans. The method 700 is performed by processing logic that may comprise hardware (circuitry, dedicated logic, etc.), software (such as is run on a general purpose computer system or a dedicated machine), or a combination of both. Method 700 may be performed by a host based DLP system or network based DLP system, such as those discussed with reference to the preceding figures.

Referring to FIG. 7A, at block 702 a computing device receives data that may include sensitive information. The data may be received by a data loss prevention system operating on the computing device. At block 704, the data loss prevention system scans the data to determine whether it includes any sensitive information.

At block 706, the DLP system determines whether the data violates any DLP policies based on a result of the scan. If the data does violate a DLP policy (e.g., the data contains a threshold amount of sensitive or confidential information), the method proceeds to block 708. Otherwise, the method proceeds to block 712.

At block 708, the DLP system applies the violated DLP policy to the data. Applying the DLP policy to the data includes performing one or more actions that are included in the DLP policy.

At block 710, the DLP system determines whether any copies of the data exist on the computing device and/or on a local or remote storage. In one embodiment, the DLP system determines whether any copies of the data exist using a single instance storage (SIS) database. The SIS database may include a SIS signature table. The SIS database may also include one or more mappings between block level data, file level data, block level signatures and file level signatures.

Figure 7B:
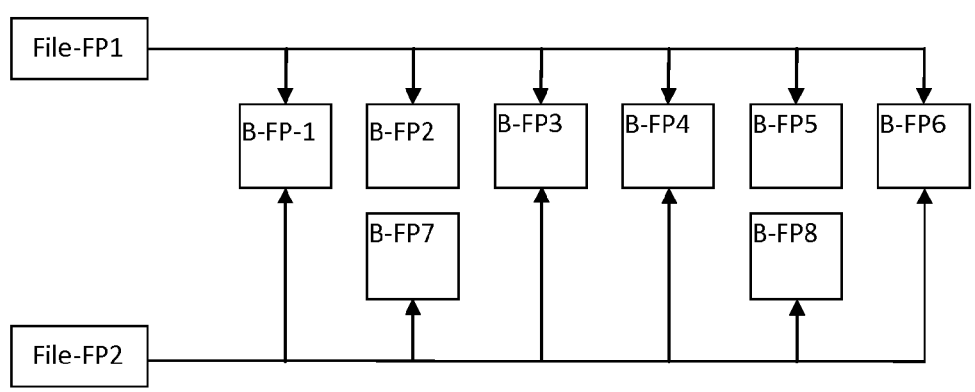
FIG. 7B illustrates an example single instance storage signature table, in accordance with one embodiment of the present invention.

FIG. 7B illustrates an example single instance storage signature table 750, in accordance with one embodiment of the present invention. The SIS signature table 750 maps files to fingerprints of files. The fingerprints may alternatively be checksums, hashes, or other signatures that uniquely identify a file based on its contents. As illustrated, files that have different names and/or that are stored in different locations may be mapped to the same fingerprint. For example, the file C:\my_file.txt and the file D:\my_file_tmp.txt include the same contents, and are therefore both mapped to file fingerprint FP1. If a file's fingerprint matches a fingerprint included in the SIS signature table, the SIS signature table may be used to apply a scan result to other files having the same fingerprint. For example, if a scan is performed of the file C:\my_file.txt, a scan result of the scan may be applied to the file D:\my_file_tmp.txt, thus reducing the number of scans that need to be performed.

Figure 7C:
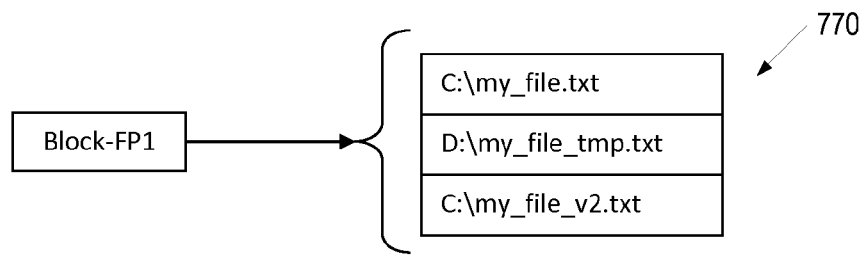
FIG. 7C illustrates a mapping of a relationship between file fingerprints and block fingerprints, in accordance with one embodiment of the present invention.

In one embodiment, each file fingerprint (e.g., file FP1 and file FP2) can be divided into one or more block fingerprints. The block fingerprints are fingerprints of data at block level. FIG. 7C illustrates a mapping 760 of a relationship between file fingerprints and block fingerprints, in accordance with one embodiment of the present invention. As shown, different file fingerprints may include some of the same block fingerprints. For example both file fingerprint one (file-FP1) and file fingerprint two (file-FP2) contain block fingerprints one (B-FP-1), block fingerprint three (B-FP-3), block fingerprint four (B-FP-4) and block fingerprint six (B-FP-6).

Figure 7D:
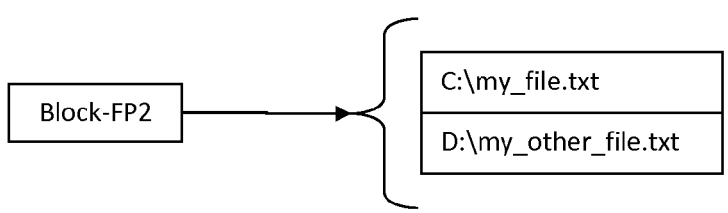
FIG. 7D illustrates mappings between block fingerprints and files.

FIG. 7D illustrates mappings 770 between block fingerprints and files. Block fingerprint one (block FP1) is mapped to all three of the files included in the file SIS signature table 750. Block fingerprint two (block FP2) is mapped to the files C:\my_file.txt and D:\my_file_tmp.txt.

Referring to FIG. 7A, if copies do exist, then the method proceeds to block 714, and the DLP system applies the same DLP policy to the copies without performing an additional scan on any of the copies. This can conserve system resources. If no copies of the data exist, the method ends.

At block 712, the DLP system determines whether any copies of the data exist. If no copies exist, the method ends. If one or more copies do exist, then the method proceeds to block 716. At block 716, the DLP system determines that the copies do not violate the DLP policy without performing any additional scan on the copies. The method then ends.

Figures 8A, 8B:
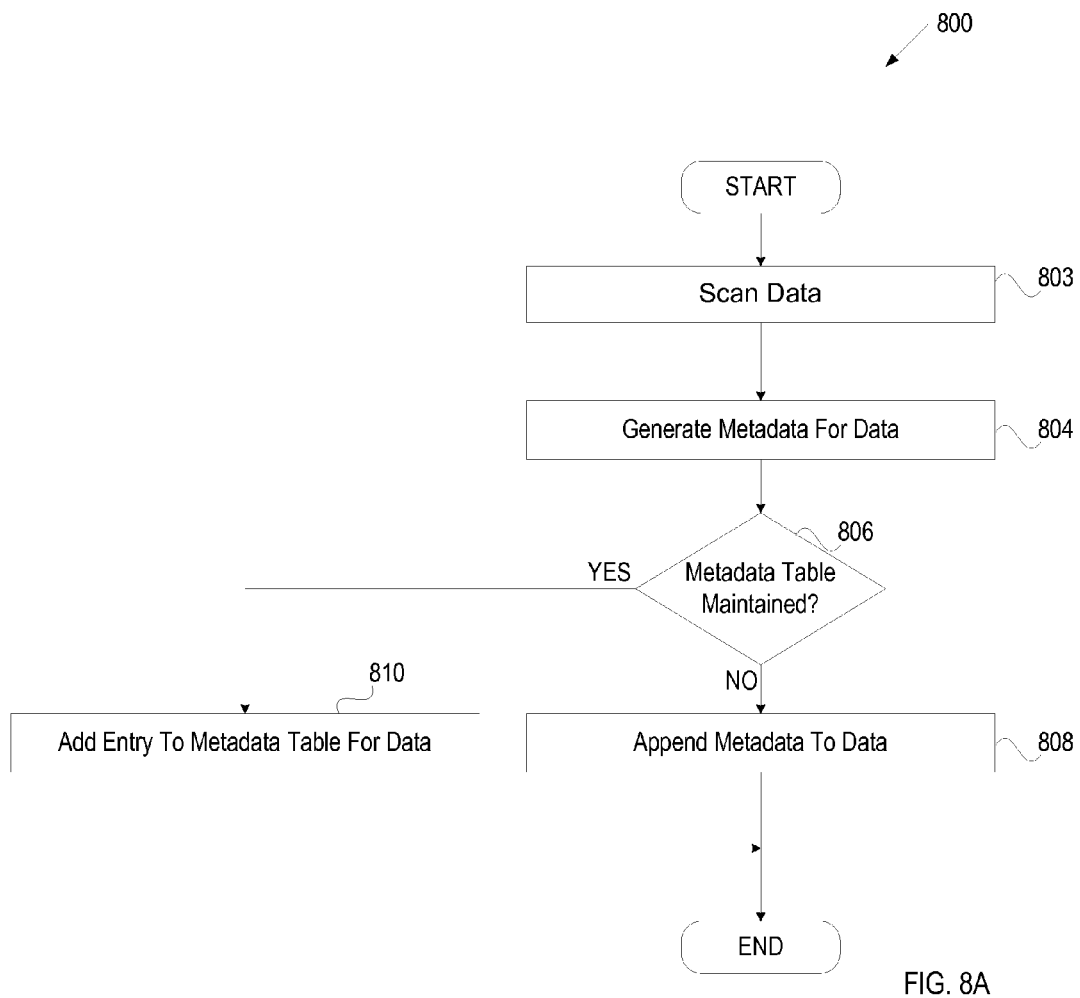
FIG. 8A is a flow diagram of an embodiment of a method for generating metadata based on scan results.
FIG. 8B illustrates an example metadata table that may maintain scan results, in accordance with one embodiment of the present invention.

FIG. 8A is a flow diagram of an embodiment of a method 800 for generating metadata based on scans. The method 800 is performed by processing logic that may comprise hardware (circuitry, dedicated logic, etc.), software (such as is run on a general purpose computer system or a dedicated machine), or a combination of both. Method 800 may be performed by a host based DLP system or network based DLP system, such as those discussed with reference to the preceding figures. Method 800 may be performed each time a scan is performed on data. For example, method 800 may be performed at block 704 of method 700, at block 630 of method 600, at block 512 of method 500, and so on.

Referring to FIG. 8A, at block 802 a computing device scans data to determine whether the data violates any DLP policies. At block 804, the computing device generates metadata for the data that identifies a result of the scan.

At block 806, the computing device determines whether a metadata table or other data structure for storing metadata is maintained. If a metadata table is maintained, the method proceeds to block 810, and the metadata is added to the metadata table. If no metadata table is maintained, the method proceeds to block 808, and the metadata is attached or otherwise added to the data. For example, if the data is a file, then the metadata may be added to an inode of the file. Metadata may also be added to the file even when the metadata table is maintained. In one embodiment, different metadata is maintained in the data structure than is attached to the file. Alternatively, the same metadata may be included in both the data structure and in the file. In one embodiment, the metadata added to the file includes a pointer to an entry in the table that corresponds to the scanned data. The method then ends.

FIG. 8B illustrates an example metadata table 850 that may maintain scan results, in accordance with one embodiment of the present invention. The metadata table 850 identifies a file name (or other identifier) of the data scanned, an SIS signature (or checksum) generated from the data contents, a time stamp of when the metadata was generated (e.g., when the scan was performed), and one or more signatures of indexed data that the scanned data matches.

Figure 9:
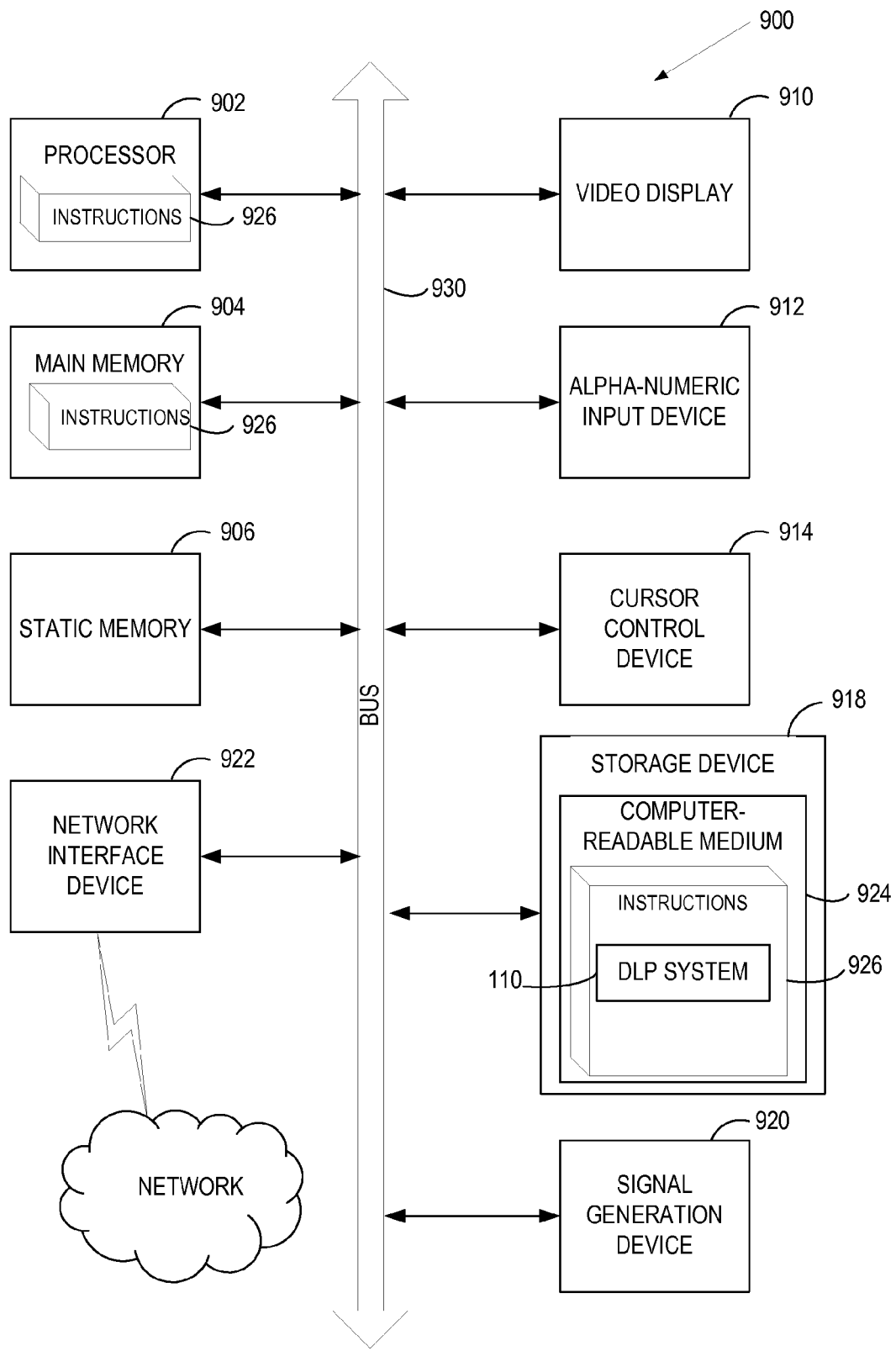
FIG. 9 is a block diagram of an exemplary computer system that may perform one or more of the operations described herein.

FIG. 9 illustrates a diagrammatic representation of a machine in the exemplary form of a computer system 900 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 900 includes a processing device (processor) 902, a main memory 904 (e.g., read-only memory (ROM), flash memory, dynamic random access memory (DRAM) such as synchronous DRAM (SDRAM) or Rambus DRAM (RDRAM), etc.), a static memory 906 (e.g., flash memory, static random access memory (SRAM), etc.), and a data storage device 918, which communicate with each other via a bus 930.

Processor 902 represents one or more general-purpose processing devices such as a microprocessor, central processing unit, or the like. More particularly, the processor 902 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 902 may also be one or more special-purpose processing devices such as an application specific integrated circuit (ASIC), a field programmable gate array (FPGA), a digital signal processor (DSP), network processor, or the like. The processor 902 is configured to execute instructions 926 for performing the operations and steps discussed herein.

The computer system 900 may further include a network interface device 922. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), and a signal generation device 920 (e.g., a speaker).

The data storage device 918 may include a machine-accessible storage medium 924 on which is stored one or more sets of instructions 926 embodying any one or more of the methodologies or functions described herein. For example, the instructions 926 may include instructions for a host based DLP system 110. The instructions 926 may also reside, completely or at least partially, within the main memory 904 and/or within the processor 902 during execution thereof by the computer system 900, the main memory 904 and the processor 902 also constituting machine-accessible storage media.

While the computer-readable storage medium 924 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical media, and magnetic media.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

We claim:

1. A method comprising:
    receiving a file, the file having metadata comprising data indicating that the file has previously been scanned for confidential information, whether content of the file contains confidential information, and a version of a data loss prevention (DLP) policy associated with a previous scan of the file;
    determining, by a processing device, from the metadata for the file, that the content of the file contains confidential information;
    determining, from the metadata for the file, whether the data loss prevention policy has been modified since the file was previously scanned; and
    if the metadata of the file indicates that the DLP policy has not been modified since the file was previously scanned, determining whether or not the file violates the data loss prevention policy using the data in the metadata indicating whether the content of the file contains confidential information; and
    if the metadata of the file indicates that the DLP policy has been modified since the file was previously scanned, scanning the file to determine whether or not the file violates the modified data loss prevention policy.

2. The method of claim 1, further comprising:
    determining whether the file has been modified since it was previously scanned; and
    using the result of the previous scan only if the file has not been modified.

3. The method of claim 1, wherein the previous scan made a separate determination for each of a plurality of portions of the file as to whether that portion of the file violated the data loss prevention policy, the method further comprising:
    determining that a portion of the file has been modified since the file was previously scanned;
    using results of the previous scan for the plurality of portions of the file that are unmodified to decide whether any of the plurality of portions that are unmodified violated the data loss prevention policy; and
    if at least one of the plurality of portions of the file that are unmodified violated the data loss prevention policy, concluding that the file violates the data loss prevention policy.

4. The method of claim 3, further comprising:
    if none of the plurality of portions of the file that are unmodified violated the data loss prevention policy, scanning the portion of the file that has been modified to determine whether or not the portion of the file that has been modified violates the data loss prevention policy; and
    if the portion of the file that has been modified does not violate the data loss prevention policy, concluding that the file does not violate the data loss prevention policy.

5. The method of claim 1, further comprising:
checking a digital signature that was generated upon completion of the previous scan to determine whether the results of the previous scan were tampered with; and
scanning the file if the results of the previous scan were tampered with.

6. The method of claim 1, further comprising:
generating a checksum of the file;
comparing the checksum of the file to previously generated checksums of other files; and
if the checksum matches one of the previously generated checksums, deciding that the file matches one of the other files.

7. The method of claim 1, further comprising:
generating a plurality of checksums for the file, each of the plurality of checksums being associated with a portion of the file;
comparing the plurality of checksums to previously generated checksums of portions of other files; and
for each of the plurality of checksums that matches one of the previously generated checksums, relying upon a previous scan that identifies whether the portion of the other file that is associated with the previously generated checksum violated a data loss prevention policy.

8. A non-transitory computer readable storage medium having instructions that, when executed by a processing device, cause the processing device to perform operations comprising:
receiving a file, the file having metadata comprising data indicating that the file has previously been scanned for confidential information, whether content of the file contains confidential information, and a version of a data loss prevention (DLP) policy associated with a previous scan of the file;
determining, by the processing device, from the metadata for the file, that the content of the file contains confidential information;
determining, from the metadata for the file, whether the data loss prevention policy has been modified since the file was previously scanned;
if the metadata of the file indicates that the DLP policy has not been modified since the file was previously scanned, determining whether or not the file violates the data loss prevention policy using the data in the metadata indicating whether the content of the file contains confidential information; and
if the metadata of the file indicates that the DLP policy has been modified since the file was previously scanned, scanning the file to determine whether or not the file violates the modified data loss prevention policy.

9. The computer readable storage medium of claim 8, the operations further comprising:
determining whether the file has been modified since it was previously scanned and whether the data loss prevention policy has been modified since the file was previously scanned; and
using the result of the previous scan only if the file has not been modified and the data loss prevention policy has not been modified since the file was previously scanned.

10. The non-transitory computer readable storage medium of claim 8, wherein the previous scan made a separate determination for each of a plurality of portions of the file as to whether that portion of the file violated the data loss prevention policy, the operations further comprising:
determining that a portion of the file has been modified since the file was previously scanned;
using results of the previous scan for the plurality of portions of the file that are unmodified to decide whether any of the plurality of portions that are unmodified violated the data loss prevention policy; and
if at least one of the plurality of portions of the file that are unmodified violated the data loss prevention policy, concluding that the file violates the data loss prevention policy.

11. The non-transitory computer readable storage medium of claim 10, the operations further comprising:
if none of the plurality of portions of the file that are unmodified violated the data loss prevention policy, scanning the portion of the file that has been modified to determine whether or not the portion of the file that has been modified violates the data loss prevention policy; and
if the portion of the file that has been modified does not violate the data loss prevention policy, concluding that the file does not violate the data loss prevention policy.

12. The non-transitory computer readable storage medium of claim 8, the operations further comprising:
checking a digital signature that was generated upon completion of the previous scan to determine whether the results of the previous scan were tampered with; and
scanning the file if the results of the previous scan were tampered with.

13. The non-transitory computer readable storage medium of claim 8, the operations further comprising:
generating a checksum of the file;
comparing the checksum of the file to previously generated checksums of other files; and
if the checksum matches one of the previously generated checksums, deciding that the file matches one of the other files.

14. The non-transitory computer readable storage medium of claim 8, the operations further comprising:
generating a plurality of checksums for the file, each of the plurality of checksums being associated with a portion of the file;
comparing the plurality of checksums to previously generated checksums of portions of other files; and
for each of the plurality of checksums that matches one of the previously generated checksums, relying upon a previous scan that identifies whether the portion of the other file that is associated with the previously generated checksum violated a data loss prevention policy.

15. A system comprising:
a memory; and
a processing device coupled to the memory, the processing device to:
receive a file, the file having metadata comprising data indicating that the file has previously been scanned for confidential information, whether content of the file contains confidential information, and a version of a data loss prevention (DLP) policy associated with a previous scan of the file;
determine, from the metadata for the file, that the content of the file contains confidential information;
determine, from the metadata for the file, whether the data loss prevention policy has been modified since the file was previously scanned; and
if the metadata of the file indicates that the DLP policy has not been modified since the file was previously scanned, determine whether or not the file violates the data loss prevention policy using the data in the metadata indicating whether the content of the file contains confidential information; and if the metadata of the file indicates that the DLP policy has been modified since the file was previously scanned, scan the file to determine whether or not the file violates the modified data loss prevention policy.

16. The system of claim 15, wherein the processing device is further to:
   determine whether the file has been modified since it was previously scanned; and
   use the result of the previous scan only if the file has not been modified.

17. The system of claim 15, wherein the previous scan made a separate determination for each of a plurality of portions of the file as to whether that portion of the file violated the data loss prevention policy, the processing device is further to:
   determine that a portion of the file has been modified since the file was previously scanned;
   use results of the previous scan for the plurality of portions of the file that are unmodified to decide whether any of the plurality of portions that are unmodified violated the data loss prevention policy; and
   if at least one of the plurality of portions of the file that are unmodified violated the data loss prevention policy, conclude that the file violates the data loss prevention policy.

18. The system of claim 17, wherein the processing device is further to:
   if none of the plurality of portions of the file that are unmodified violated the data loss prevention policy, scan the portion of the file that has been modified to determine whether or not the portion of the file that has been modified violates the data loss prevention policy; and
   if the portion of the file that has been modified does not violate the data loss prevention policy, conclude that the file does not violate the data loss prevention policy.

19. The system of claim 15, wherein the processing device is further to:
   check a digital signature that was generated upon completion of the previous scan to determine whether the results of the previous scan were tampered with; and
   scan the file if the results of the previous scan were tampered with.

* * * * *